UNITED STATES PATENT OFFICE.

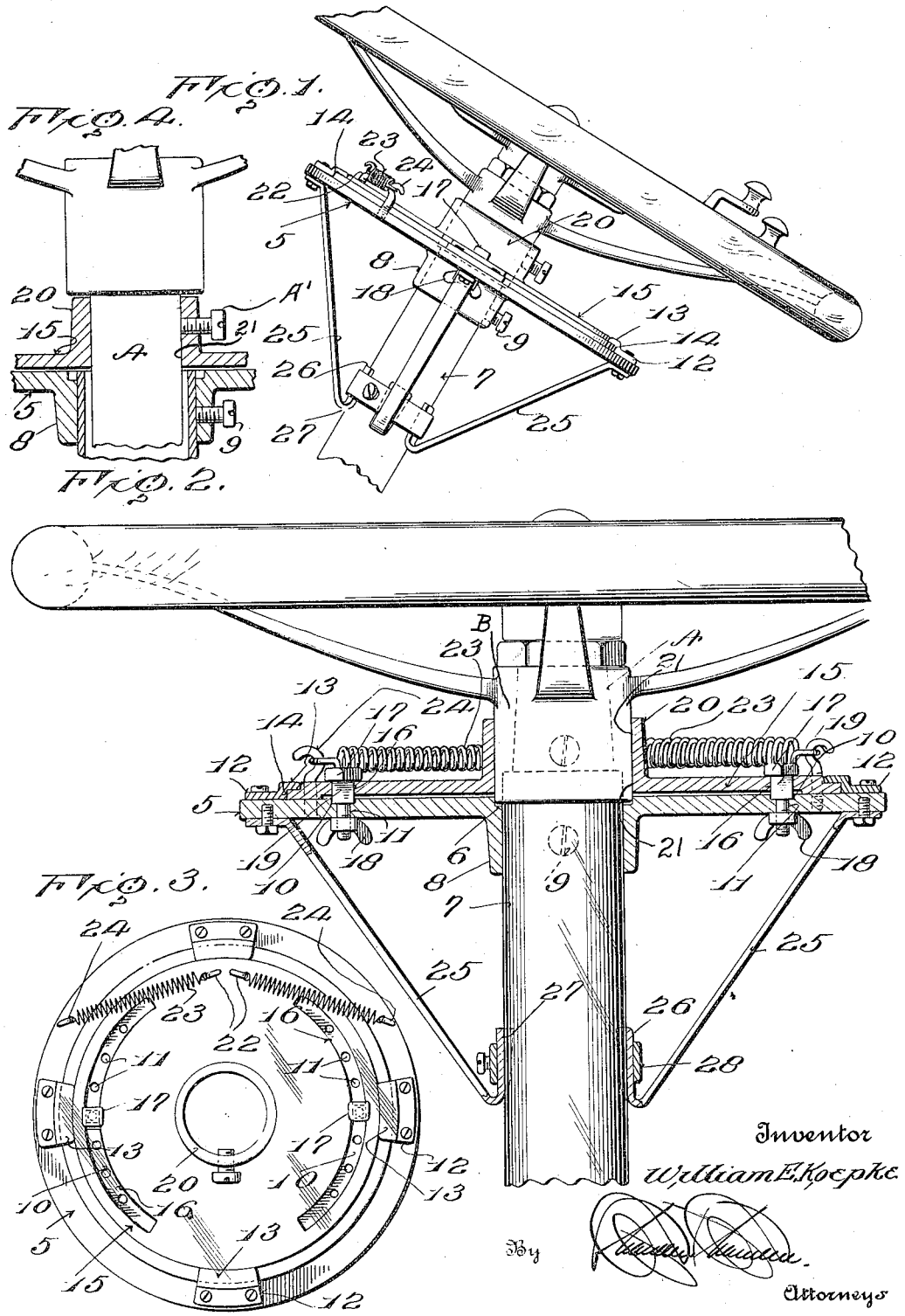

WILLIAM ERNST KOEPKE, OF SISSETON, SOUTH DAKOTA.

STEERING-BALANCE.

1,320,557. Specification of Letters Patent. Patented Nov. 4, 1919.

Application filed May 17, 1919. Serial No. 297,915.

*To all whom it may concern:*

Be it known that I, WILLIAM ERNST KOEPKE, a citizen of the United States, residing at Sisseton, in the county of Roberts, State of South Dakota, have invented certain new and useful Improvements in Steering-Balances; and I do hereby declare the following to be a full, clear, and exact description of the invention, such as will enable others skilled in the art to which it appertains to make and use the same.

This invention relates to steering apparatus for automobiles, and has for its object to provide an auxiliary balancing device which may be applied to the steering column and steering post of an automobile and which will be operative to retain the front wheels of the vehicle yieldably in position to track in alinement with the rear wheels thus returning the front wheels to "straight ahead" position should the steering wheel be released while the vehicle is being turned.

Another object of the invention is to provide a device of this kind which may be readily and easily applied and which will be within sight of the operator so that any damage thereto may be readily ascertained and remedied.

Another object is to provide a structure of this kind including a means for limiting the rotation of the steering wheel, the limiting means being adjustable to suit different conditions.

Other objects and advantages will be apparent from the following description.

In the drawings:

Figure 1 is an elevational view of the steering column and steering wheel of an automobile with the present invention applied thereto.

Fig. 2 is a longitudinal section taken centrally through the present device, the steering column and steering post, the steering wheel being shown in sections.

Fig. 3 is a top plan with the steering wheel removed.

Fig. 4 is a detail section of a modification.

Referring now to the drawings, the present invention comprises a circular plate 5, having a central opening 6 for the reception of the steering column of a vehicle indicated at 7. A collar 8 is formed integral with the plate 5 and extends beyond the under face thereof, encircling the steering column, to which it is attached against rotation by suitable set screws or other fastening means indicated at 9.

Formed in the upper surface of the plate 5, concentric with the central opening 6 but spaced considerably therefrom, there are arcuate channels 10, each provided with a series of openings 11 in its bottom, these openings passing through the plate 5. Outwardly of the channels 10, the plate 5 carries flange members 12, also arcuate in formation and having inwardly directed flanges 13 spaced from the plate 5. These flanges 13, coöperating with the plate 5, form guide ways 14 for the edge portion of a rotary plate member 15 which is provided with arcuate slots 16 coinciding with the channels 10. Engaged through one of the openings 11 of each series, and interchangeably engageable in all of these openings, there is a stop bolt 17 provided with a wing nut 18 at its lower end. These bolts 17 are shouldered as indicated at 19 for engagement with the bottoms of the channels 10, as shown. The stop bolts, passing through the slots 16 act to limit the rotation of the plate 15 with respect to the plate 5.

An upwardly extending collar 20 is carried by plate 15 concentric with the central opening 21 of the plate. This collar may be mounted upon the hub B of the steering wheel and held by a set screw B' as shown in Figs. 1 and 2 of the drawings or it may be mounted directly upon the steering post A and held in position by a set screw A', as shown in Fig. 4 of the drawings. In applying the device as shown in Fig. 4 of the drawings a short section of the steering column 7 is cut away, as will be understood.

Secured to the plate 15 there are a pair of upwardly extending hooks 22, with each of which a helical spring 23 is engaged. These springs extend outwardly and at their outer ends engage with hooks 24 carried by the plate 5. The disposition of the hooks 24 with respect to the hooks 22 is such that the spring 23 yieldably resists rotation of the plate 15 upon the plate 5. Thus, if the plate 15 be turned with the steering wheel and steering post, one of the springs will be stretched while the other will be slacked. If the wheel be released, the tension of the spring will return the plate 15 to normal position which, it is understood, is with the front wheels of the vehicle straight ahead and tracking with the rear wheels.

To support the plate 5, a series of bracing arms 25 are secured at their upper ends thereto, these arms extending downwardly and inwardly toward the steering column and having upturned lower ends 26, the inner surfaces of which are concaved as indicated at 27 for engagement against the outer surface of the steering column. A collar 28 is engaged about the steering column over the ends 26 and is clamped to hold the ends securely against the column. Thus the plate 5 is properly supported and braced.

What is claimed is:

1. A steering balance for vehicles comprising a plate having a central opening for the reception of the steering column of a vehicle, a second plate rotatably mounted concentrically with the first plate and having an opening therein for the reception of a steering post, said second plate being adapted for connection with the steering wheel for rotation therewith, guide members carried by the first mentioned plate and extending over the edge portions of the second plate, and springs connected to the second plate and to the first plate and arranged to resist yieldably rotation of the second plate with respect to the first plate.

2. A steering balance for vehicles comprising a plate having a central opening for the reception of the steering column of a vehicle, a second plate rotatably mounted concentrically with the first plate and having an opening therein for the reception of a steering post, said second plate being adapted for connection with the steering wheel for rotation therewith, guide members carried by the first mentioned plate and extending over the edge portions of the second plate, springs connected to the second plate and to the first plate and arranged to resist yieldably rotation of the second plate with respect to the first plate, brace members carried by the first mentioned plate, and extending downwardly and inwardly through the steering column and in engagement therewith, and a collar engaged about the lower ends of the brace members and the steering column in a way to prevent movement of the brace members with respect to the steering column.

In testimony whereof I affix my signature.

WILLIAM ERNST KOEPKE.

Copies of this patent may be obtained for five cents each, by addressing the "Commissioner of Patents, Washington, D. C."